(12) United States Patent
Kim et al.

(10) Patent No.: US 10,622,688 B2
(45) Date of Patent: Apr. 14, 2020

(54) COOLANT DIRECT-CONTACT COOLING-TYPE BATTERY PACK

(71) Applicant: LG CHEM, LTD., Seoul (KR)

(72) Inventors: Tae-Geun Kim, Daejeon (KR); Jin-Woo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/113,450

(22) Filed: Aug. 27, 2018

(65) Prior Publication Data

US 2019/0074562 A1  Mar. 7, 2019

(30) Foreign Application Priority Data

Sep. 4, 2017  (KR) .................. 10-2017-0112721

(51) Int. Cl.

| | |
|---|---|
| *H01M 10/6556* | (2014.01) |
| *H01M 10/625* | (2014.01) |
| *H01M 10/6551* | (2014.01) |
| *H01M 2/08* | (2006.01) |
| *H01M 10/6567* | (2014.01) |
| *H01M 2/10* | (2006.01) |
| *H01M 10/613* | (2014.01) |
| *B60L 58/26* | (2019.01) |
| *B60L 50/64* | (2019.01) |
| *H01M 10/6555* | (2014.01) |
| *H01M 10/647* | (2014.01) |

(52) U.S. Cl.
CPC ......... *H01M 10/6556* (2015.04); *B60L 50/64* (2019.02); *B60L 58/26* (2019.02); *H01M 2/08* (2013.01); *H01M 2/1077* (2013.01); *H01M 10/613* (2015.04); *H01M 10/625* (2015.04); *H01M 10/6551* (2015.04); *H01M 10/6555* (2015.04); *H01M 10/6567* (2015.04); *H01M 10/647* (2015.04); *H01M 2220/20* (2013.01)

(58) Field of Classification Search
CPC .................................................. H01M 10/60
See application file for complete search history.

(56) References Cited

U.S. PATENT DOCUMENTS

| | | | |
|---|---|---|---|
| 9,306,250 B2 | 4/2016 | Tao et al. | |
| 2012/0156543 A1* | 6/2012 | Cicero | H01M 2/024 |
| | | | 429/120 |
| 2013/0004822 A1* | 1/2013 | Hashimoto | H01M 2/1072 |
| | | | 429/120 |

(Continued)

FOREIGN PATENT DOCUMENTS

| | | | | |
|---|---|---|---|---|
| KR | 20120111686 A | * | 10/2012 | ........ H01M 10/6569 |
| KR | 20140000770 A | * | 1/2014 | ............. H01M 2/08 |

(Continued)

*Primary Examiner* — James Lee
(74) *Attorney, Agent, or Firm* — Morgan, Lewis & Bockius LLP

(57) ABSTRACT

Disclosed is a battery pack, which includes a battery module including a plurality of battery cells; a heatsink in which a cooling medium flows, the heatsink having an opening that is at least partially opened so that the cooling medium directly contact at least one surface of the battery module through the opening; and a sealing gasket mounted to the battery module to surround an outer periphery of the at least one surface of the battery module so as to prevent the cooling medium from leaking out of a contact interface of the battery module and the heatsink.

19 Claims, 7 Drawing Sheets

(56) References Cited

U.S. PATENT DOCUMENTS

2015/0147639 A1* 5/2015 Uchida .................. F16J 15/022
429/185
2017/0125865 A1* 5/2017 Mascianica ......... B60L 11/1874
2018/0114957 A1    4/2018 Kim et al.

FOREIGN PATENT DOCUMENTS

| KR | 10-2014-0077272 A | 6/2014 | |
|----|-------------------|--------|---|
| KR | 20160149576 A * | 12/2016 | |
| KR | 20170021122 A * | 2/2017 | ........ H01M 10/6556 |

* cited by examiner

COOLANT DIRECT-CONTACT COOLING-TYPE BATTERY PACK

TECHNICAL FIELD

The present application claims priority to Korean Patent Application No. 10-2017-0112721 filed on Sep. 4, 2017 in the Republic of Korea, the disclosures of which are incorporated herein by reference.

The present disclosure relates to a battery pack, and more particularly, to a battery pack capable of improving cooling efficiency.

BACKGROUND ART

Secondary batteries, which are easy to apply to various product groups and have electrical characteristics such as high electrical energy density, are used not only for portable devices but also for electric vehicles (EV), hybrid electric vehicles (HEV), energy storage devices or the like, which are driven by electric power sources. The secondary batteries are attracting attention as a new energy source for enhancing eco-friendliness and energy efficiency since they have a primary advantage of dramatically reducing the use of fossil fuels and also no by-products are generated by the use of energy.

A battery pack applied to the electric vehicle or the like has a structure in which a plurality of battery modules, each having a plurality of unit cells, are connected in series and/or in parallel to obtain high output. Also, the unit cell includes positive and negative electrode current collectors, a separator, an active material, an electrolyte solution and the like to be repeatedly charged and discharged by electrochemical reaction among these components.

Meanwhile, since a middle-sized or large-sized battery pack is manufactured such that a plurality of battery modules are densely arranged in a narrow space, it is very important to emit heat generated from each battery cell.

Since the secondary battery is charged or discharged by the electrochemical reaction as described above, the battery is affected by the ambient temperature condition environment. For example, if the secondary battery is charged or discharged in an extremely poor temperature condition such as at a cryogenic or hyperthemic temperature, the charging and discharging efficiency of the battery is lowered, and thus it may be difficult to ensure the normal operation performance. In particular, since a lithium ion secondary battery may ignite or explode when exposed to a high temperature environment for a long time, the related industry is focusing on the development of a middle-sized or large-sized battery pack having a high output capacity and excellent cooling efficiency.

As a method of emitting heat generated from the battery module, Korean Unexamined Patent Publication No. 10-2014-0077272 discloses a method of cooling battery modules using a heatsink in which a coolant flows.

Meanwhile, as shown in FIG. 1, in order to cool a battery module 1 using a heatsink, a thermal interface material (TIM) 3 is interposed between the battery module 1 and the heatsink 2. The TIM 3 functions to reduce the thermal contact resistance between the battery module 1 and the heatsink 2 by filling void spaces created due to the surface roughness of the contact surfaces thereof. Currently, a thermal pad or resin with high thermal conductivity is widely used as the TIM 3.

However, the resin-type TIM has a problem in product application and quality control, and the thermal pad-type TIM has significantly lower cooling efficiency, compared to the resin-type TIM, though it is advantageous in product application and quality control.

Thus, there is demanded a new battery pack cooling method which may improve the cooling efficiency by effectively reducing the thermal contact resistance between the battery module 1 and the heatsink 2, while ensuring easy process and quality control.

RELATED LITERATURES

Patent Literature

Korean Unexamined Patent Publication No. 10-2014-0077272 (Jun. 24, 2014), Dahancalsonic Co., Ltd.

DISCLOSURE

Technical Problem

The present disclosure is designed to solve the problems of the related art, and therefore the present disclosure is directed to providing a battery pack, which may be capable of solving a problem of thermal contact resistance between a battery module and a heatsink and have a cooling structure capable of increasing cooling efficiency compared to a conventional technique using a TIM These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: a battery module including a plurality of battery cells; a heatsink in which a cooling medium flows, the heatsink having an opening that is at least partially opened so that the cooling medium directly contact at least one surface of the battery module through the opening; and a sealing gasket mounted to the battery module to surround an outer periphery of the at least one surface of the battery module so as to prevent the cooling medium from leaking out of a contact interface of the battery module and the heatsink.

The opening may be formed at a central region of a top surface of the heatsink, and the battery module may be disposed so that a bottom surface thereof is placed on the top surface of the heatsink while covering the opening of the heatsink.

The sealing gasket may be provided in a bent form to surround an edge portion of the battery module where the bottom surface thereof intersects a side surface thereof.

The sealing gasket may be provided to be capable of adhering to at least one of the battery module and the heatsink at a location between the bottom surface of the battery module and the top surface of the heatsink.

The battery pack may further comprise a waterproof sealant applied along an outer side of the adhering portion between at least one of the battery module and the heatsink and the sealing gasket.

The sealing gasket may be provided in a doubly bent form to further surround an edge portion of the heatsink where the top surface of the heatsink intersects a side surface thereof.

A coupling protrusion may be provided to any one of the sealing gasket and the top surface of the heatsink, and a coupling groove may be provided to the other thereof so that the coupling protrusion is fit into the coupling groove.

The battery pack may further comprise a coupling member integrally connected to the battery module, the sealing gasket and the heatsink to assemble the battery module, the sealing gasket and the heatsink into a single body.

Passage holes may be formed at corner regions of the battery module, the sealing gasket and the heatsink so that the coupling member is inserted therethrough.

The battery module may include a module case having an inner space capable of accommodating the battery cells and cooling fins connecting a top surface and a bottom surface of the module case to partition the inner space.

The cooling fins may be integrally formed with the module case by means of extruding.

In another aspect of the present disclosure, there is also provided a vehicle, comprising the battery pack described above. The vehicle may include electric vehicles, hybrid electric vehicles, plug-in hybrid electric vehicles and the like.

Advantageous Effects

According to an embodiment of the present disclosure, since the coolant is provided to directly contact the battery module, it is possible to eliminate the conventional problem of the contact resistance between the battery module and the heatsink. Thus, a battery pack having remarkably higher cooling performance than that of the conventional art may be provided.

Also, since the conventional TIM may not be used, it is possible to save labor and cost for product application and quality control, caused by the TIM.

In addition, since the battery module, the sealing gasket and the heatsink are assembled into a single body, it is possible to enhance the waterproof and dustproof effect.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
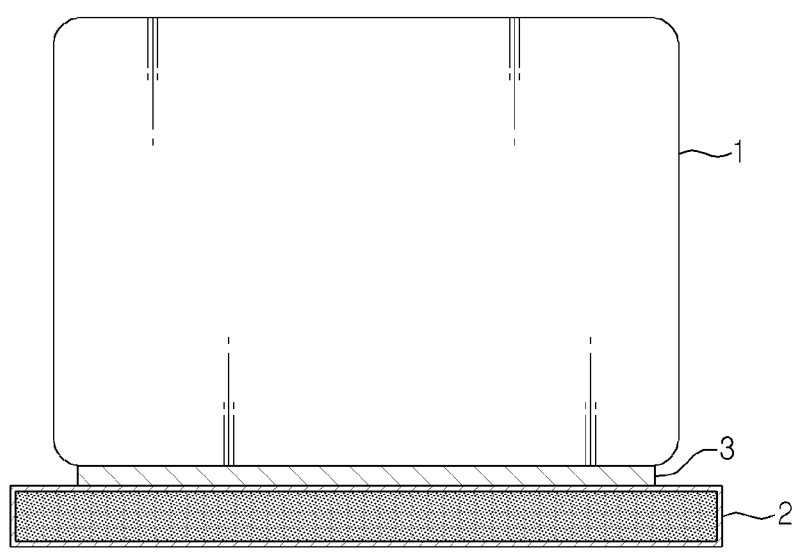
FIG. 1 is a diagram schematically showing a water-cooling configuration of a conventional battery pack.

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

That is, the embodiments described in the specification and depicted shown in the drawings are only the most preferred embodiments of the present disclosure and do not represent all the technical ideas of the present disclosure, and thus it should be understood that there may be various equivalents and variations capable of replacing the embodiments at the time of this application.

Figure 2:
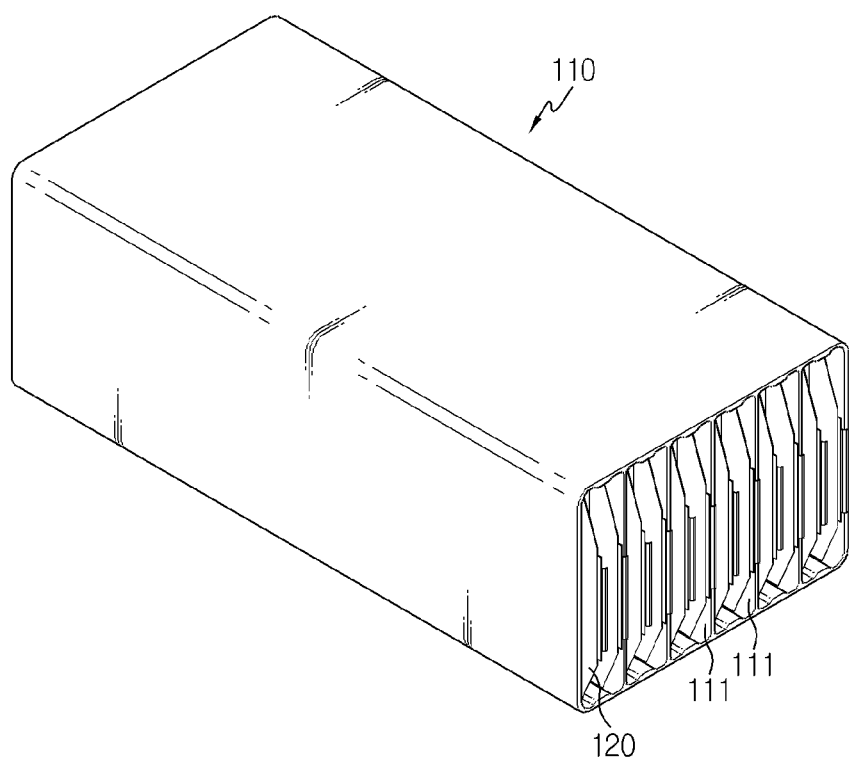
FIGS. 2 and 3 are perspective views schematically showing main components of a battery module according to an embodiment of the present disclosure.
Figure 3:
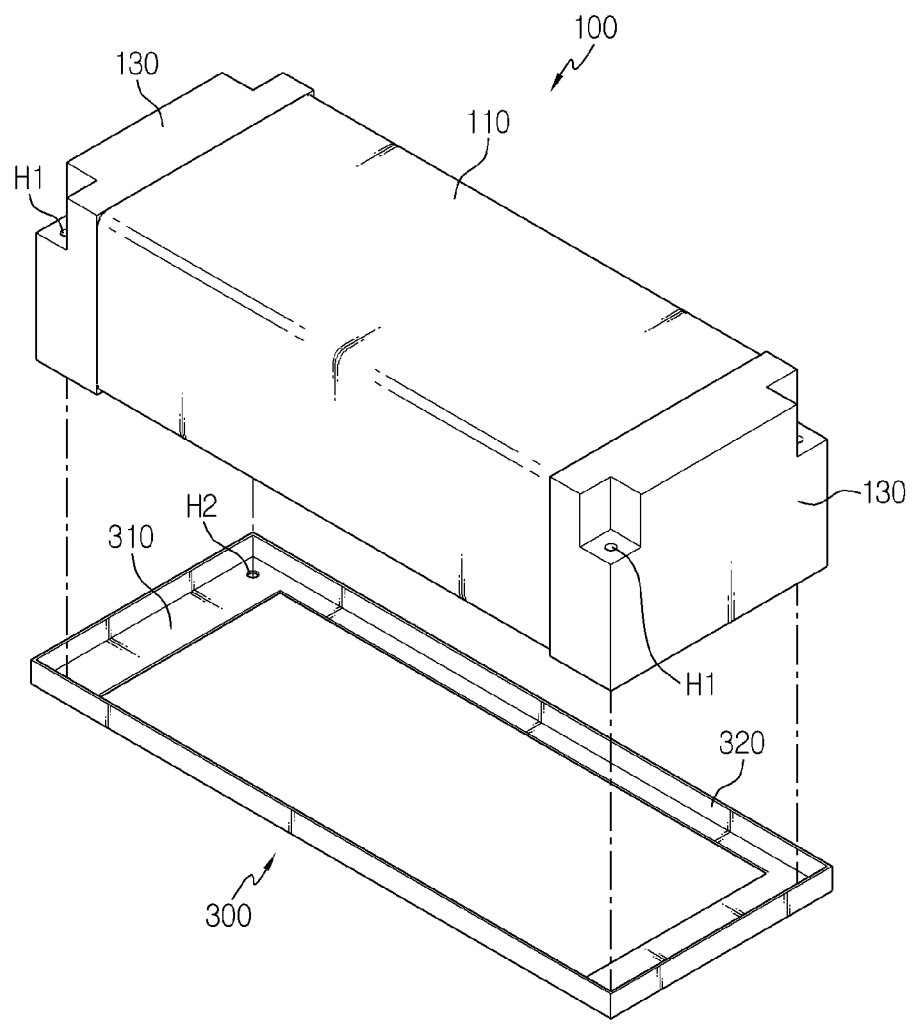
Figure 4:
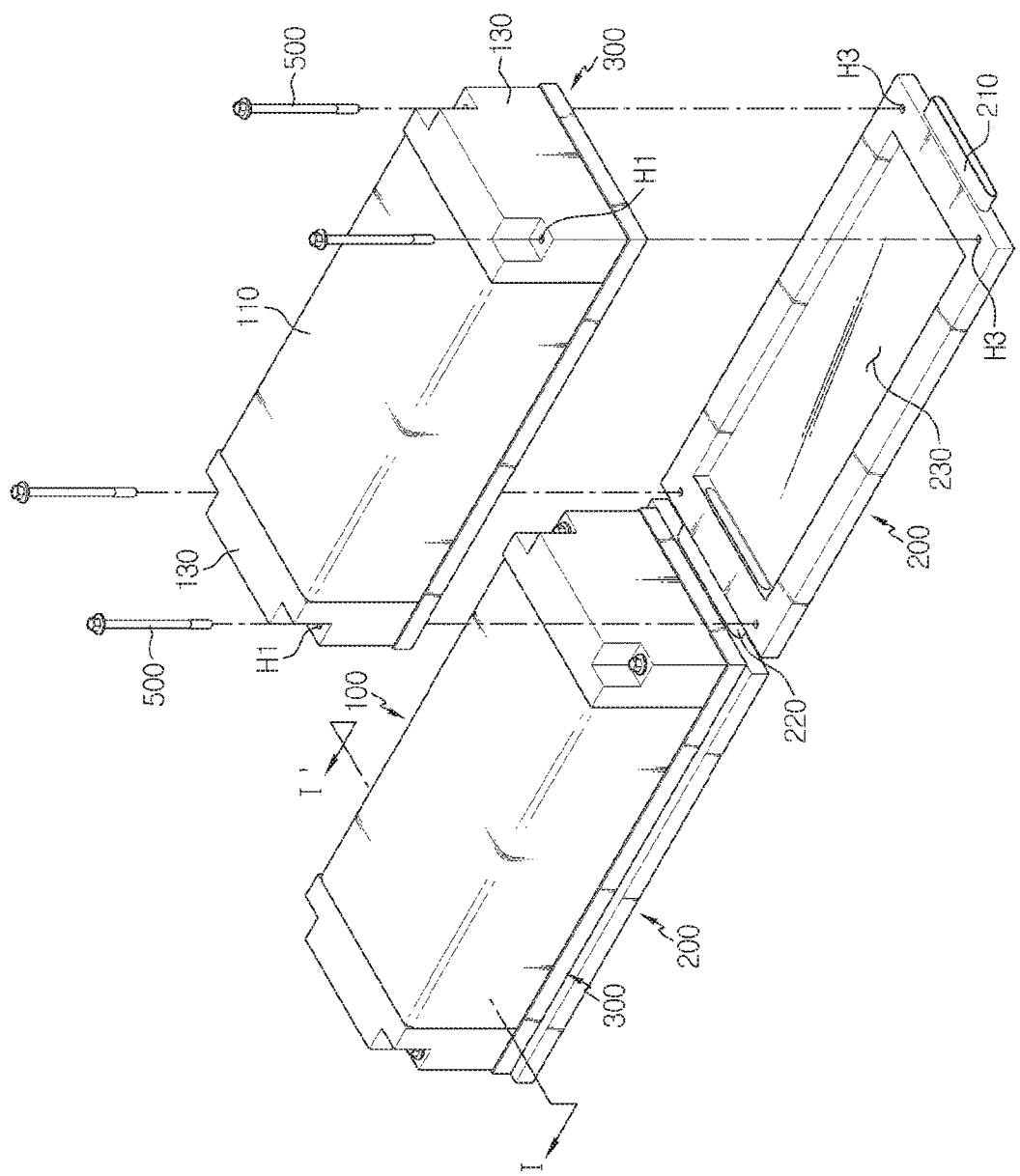
FIG. 4 is a perspective view schematically showing a cooling configuration of a battery pack according to an embodiment of the present disclosure.
Figure 5:
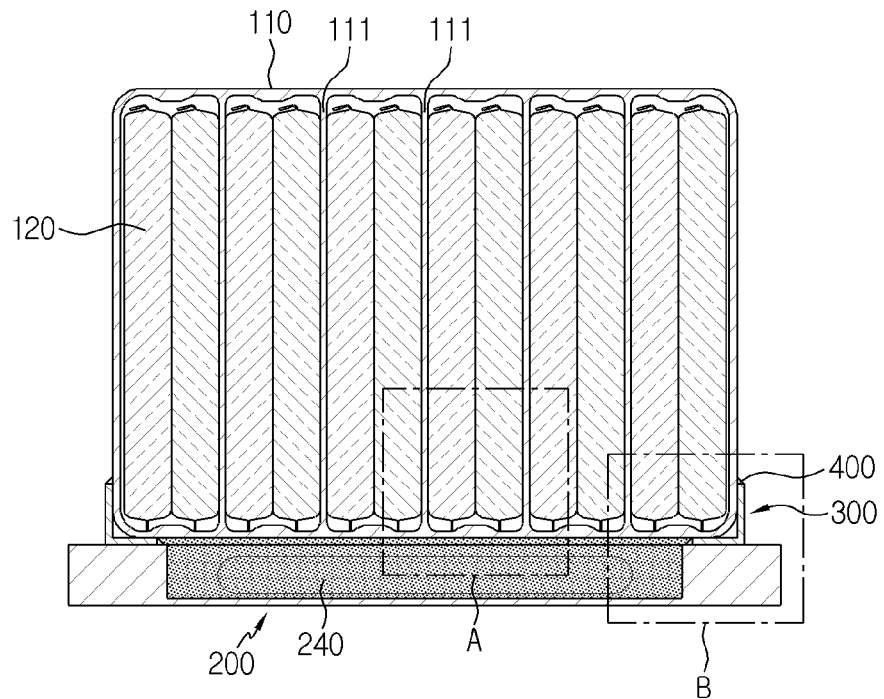
FIG. 5 is a cross-sectioned view, taken along the line I-I' of FIG. 4.

FIGS. 2 and 3 are perspective views schematically showing main components of a battery module according to an embodiment of the present disclosure, FIG. 4 is a perspective view schematically showing a cooling configuration of a battery pack according to an embodiment of the present disclosure, and FIG. 5 is a cross-sectioned view, taken along the line I-I' of FIG. 4.

Referring to FIGS. 2 to 5, a battery pack according to an embodiment of the present disclosure may include at least one battery module 100, a heatsink 200, and a sealing gasket 300 interposed into a contact interface of the battery module 100 and the heatsink 200.

First, the battery module 100 will be described briefly. The battery module 100 may include a plurality of battery cells 120, a module case 110 for accommodating the plurality of battery cells 120, and a sensing unit 130 electrically coupled to the plurality of battery cells 120 and provided to be capable of being coupled to the module case 110.

The plurality of battery cells 120 may be pouch-type secondary batteries that are easy to be intensively stacked. As shown in FIG. 2, the pouch-type secondary batteries may be accommodated in the inner space of the module case 110 so as to be stacked in one direction, for example in a vertical or lateral direction.

The module case 110 may be made of a metal material having high mechanical strength and excellent thermal conductivity. For example, aluminum or an aluminum alloy may be used as the material of the module case 110.

In this embodiment, the module case 110 may be formed as a mono frame with a square tube shape. Grooves may be provided in top and bottom surfaces of the module case 110 along a longitudinal direction, and the pouch-type secondary batteries may be provided to stand upright along the grooves and be inserted into the inner space of the module case 110.

Also, the module case 110 may further include cooling fins 111 provided therein to partition the inner space by connecting the top surface and the bottom surface of the module case 110. The cooling fins 111 can be fabricated integrally with the module case 110 by means of extruding.

In the space formed by the cooling fins 111, two battery cells 120 may be interposed. In this case, one surface of the battery cell 120 may make surface contact with one surface and the other surface of the cooling fin 111, respectively.

Thus, if the cooling fins 111 are used, the cooling fins 111 and the exterior of the pouch-type secondary battery are in contact with each other over a large area, and thus it is possible to uniformly emit heat generated from each battery cell 120. In addition, since the cooling fins 111 may also serve to guide the accommodation of the battery cells 120 and prevent the movement of the battery cells 120, a separate stacking cartridge or frame structure for stacking the battery cells 120 and preventing movement of the battery cells 120 may be omitted.

The cooling fins 111 are connected to the top and bottom surfaces of the module case 110 so that the heat absorbed from the battery cells 120 may be emitted to the outside through the top surface or the bottom surface of the module case 110.

The sensing unit 130 plays a role of transmitting sensing information about an electrical characteristic such as a voltage of the battery cells 120 to another device out of the battery module 100. For example, a device such as a battery management system (BMS) may be connected to the battery module 100 to control the operation of the battery module 100 such as charging or discharging. At this time, the sensing unit 130 may be connected to the BMS to provide voltage information or the like of the battery cells 120 to the BMS, and the BMS may control the battery module 100 based on the information.

In this embodiment, the sensing unit 130 may include sensing members for electrical connection with each battery cell 120 and a protection cover for protecting the sensing members. The sensing members may include a plurality of bus bars, connectors, harness wires, printed circuit boards, or the like, which are individually connected to the pouch-type secondary batteries.

The protection cover covers the sensing members so that the sensing members are not exposed to the outside. Also, in this embodiment, the protection cover may be provided to be mountable to both sides of the module case 110. For example, the protection cover may be snap-fit with the module case 110 to protect the sensing member and cover both side surfaces of the module case 110, which are open.

At least one battery module 100 may be provided. That is, a plurality of battery modules 100 may be provided to be connected in series and/or in parallel according to the output and capacity required for the battery pack. The battery modules 100 may be cooled by the heatsink 200.

The heatsink 200 is a component for absorbing heat from the battery modules 100 to cool the battery modules 100. The heatsink 200 is disposed under each battery module 100 to support the battery module 100, and a cooling medium 240 may pass through an internal flow path of the heatsink 200 to absorb heat from the battery module 100.

At this time, the cooling medium 240 passing through the heatsink 200 is not particularly limited as long as it may easily flow through the internal flow path and is excellent in cooling performance. For example, water having high latent heat and capable of maximizing cooling efficiency may be used. However, an antifreeze, a gas cooling medium 240, air or the like may also be used as long as a flow occurs, without being limited to the above.

The heatsink 200 may be made of aluminum or aluminum alloy with high thermal conductivity, without being limited thereto. In the present disclosure, the battery module 100 and the cooling medium 240 are in direct contact with each other as described later, and thus the thermal conductivity of the heatsink 200 itself is relatively not significant. Thus, unlike the conventional art, the heatsink 200 may be made of other materials with low cost and high rigidity, even though its thermal conductivity is lower than that of aluminum or aluminum alloy.

For reference, it may be desirable that the heatsink 200 is disposed below the battery module 100 in order to enhance contact force and ensure stability due to the load of the battery module 100. However, the present disclosure is not necessarily limited thereto. Depending on the need for design changes, the heatsink 200 may be disposed at a top or side portion of the battery module 100.

One heatsink 200 may be provided to each battery module 100. In this case, the heatsinks 200 may be connected to each other in series and/or in parallel to achieve an efficient circulation structure of the cooling medium 240.

For example, the heatsink 200 may have an inlet 210 and an outlet 220 that form an entrance and an exit for the cooling medium 240, and the inlet 210 of one heatsink 200 may be connected to the outlet 220 of another heatsink 200. FIG. 4 shows that two heatsinks 200 are connected in series, but the heatsinks 200 may be further connected in series and/or parallel depending on the position and number of the inlets 210 and the outlets 220.

In particular, the heatsink 200 according to the present disclosure may have an opening 230 that is at least partially opened on the body through which the cooling medium 240 flows.

The cooling medium 240 may directly contact at least one surface of the battery module 100 through the opening 230. Further, in the present disclosure, the bottom surface of the battery module 100 is configured to cover the opening 230 of the heatsink 200, so that the cooling medium 240 may directly absorbs heat from the battery module 100 while flowing on one surface of the battery module 100. Thus, it is possible to solve the conventional problem of thermal contact resistance between the heatsink 200 and the battery module 100.

The heatsink 200 according to an embodiment of the present disclosure will be described in more detail with reference to FIGS. 4 and 5. The opening 230 may be provided to a central region of the top surface of the heatsink 200. That is, the opening 230 means a place prepared by cutting the central region of the top surface of the heatsink 200.

The bottom surface of the battery module 100 may be placed on the top surface of the heatsink 200 while covering the opening 230 of the heatsink 200. In other words, an edge of the bottom surface of the battery module 100 is supported by the top surface of the heatsink 200, and the central region of the bottom surface of the battery module 100 may cover the opening 230 of the heatsink 200.

Thus, the cooling medium 240 may flow from the outside into the heatsink 200 through the inlet 210, flow along the bottom surface of the battery module 100 through the opening 230 to absorb heat, and be discharged to the outside through the outlet 220. In this case, the cooling medium 240 may rapidly absorb the heat by directly contacting the bottom surface of the battery module 100, namely the bottom surface of the module case 110.

Figure 6:
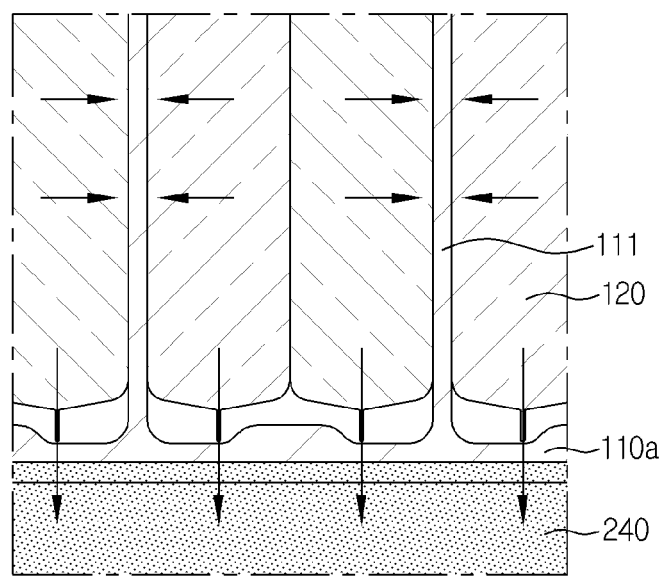
FIG. 6 is an enlarged view showing a portion A of FIG. 5.

That is, as shown in FIG. 6, if a sufficient amount of cooling medium 240 is supplied to the heatsink 200, the cooling medium 240 is discharged out of the opening 230 and contacts the bottom surface 110a of the module case. Thus, the cooling medium 240 and the module case 110 may directly exchange heat. In other words, the heat of the battery cells 120 may be transmitted to the cooling fins 111 that are in direct contact thereto, respectively, the heat of the cooling fins 111 may be transmitted to the bottom surface 110a of the module case that is integrally connected thereto, and the heat of the bottom surface 110a of the module case may be quickly emitted to the cooling medium 240 without any thermal contact resistance. Thus, the cooling configuration of the battery pack according to the present disclosure may have significantly higher thermal conductivity from the battery module 100, compared to the conventional cooling configuration of the battery pack shown in FIG. 1 to which a heat conduction medium such as a TIM is applied.

Meanwhile, the sealing gasket 300 is a rubber component that prevents the cooling medium 240 from leaking out of the contact interface of the battery module 100 and the heatsink 200. The sealing gasket 300 may be mounted to the battery module 100 to surround an outer periphery of at least one surface of the battery module 100 covering the opening 230 of the heatsink 200.

For example, the sealing gasket 300 of this embodiment may have a hollow square frame shape with an empty center as viewed from the top (see FIG. 3) and be disposed under the battery module 100.

The sealing gasket 300 may include a support portion 310 and a first bent portion 320. Here, the support portion 310 corresponds to a portion that abuts against the bottom surface of the battery module 100, and the first bent portion 320 corresponds to a portion that is bent perpendicularly with respect to the support portion 310 and contacts the side surface of the battery module 100. A rim line where the bottom surface and the side surface of the battery module 100 intersect with each other may be surrounded by the sealing gasket 300.

The sealing gasket 300 is preferably made of rubber and may be mounted to the bottom of the battery module 100 to cover the bottom edge of the battery module 100. Since the sealing gasket 300 made of rubber is elastic, if the sealing gasket 300 is put on the bottom surface of the battery module 100, the corresponding area is pressed, thereby ensuring sufficient adhesion and sealing.

In addition, the sealing gasket 300 may be provided to be capable of adhering to at least one of the battery module 100 and the heatsink 200 at a location between the bottom surface of the battery module 100 and the top surface of the heatsink 200.

For example, an adhesive layer may be further provided at one surface or both surfaces of the sealing gasket 300. Thus, the sealing gasket 300 may be attached to the bottom surface of the battery module 100 and/or the top surface of the heatsink 200 to prevent movement and moisture penetration more effectively.

Figure 7:
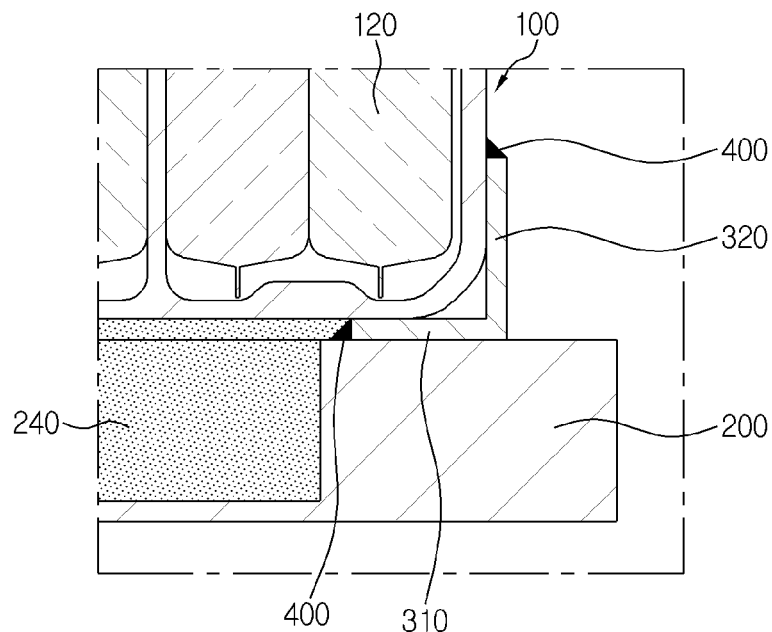
FIG. 7 is an enlarged view showing a portion B of FIG. 5.

In addition, referring to FIG. 7, a waterproof sealant 400 may be further applied along at least one of the battery module 100 and the heatsink 200 and an outline of the adhesive portion of the sealing gasket 300. Polyurethane-based urethane, silicone or epoxy may be used as the waterproof sealant 400.

For example, after the sealing gasket 300 is adhered to the top surface of the heatsink 200 firstly, the top surface of the heatsink 200 and the inner end of the sealing gasket 300 may be finished using the waterproof sealant 400. Also, after the battery module 100 is inserted into the sealing gasket 300, the side surface of the battery module 100 and the outer end of the sealing gasket 300 may be finished.

In this way, the battery pack according to the present disclosure may secure reliable waterproof performance by the sealing gasket 300, the adhesive layer of the sealing gasket 300, and the finishing treatment with the waterproof sealant 400.

Meanwhile, the battery pack 100 according to an embodiment of the present disclosure may further include a coupling member 500 that is integrally connected to the battery module 100, the sealing gasket 300 and the heatsink 200 to assemble the battery module 100, the sealing gasket 300 and the heatsink 200 into a single body.

That is, as shown in FIGS. 3 and 4, passage holes H1, H2, H3 are formed vertically at corner regions of the battery module 100, the sealing gasket 300 and the heatsink 200 so that the coupling member 500 is inserted therein, respectively. The coupling member 500 may be a long bolt.

Four long bolts, one for each corner region, may be used in total to fix the battery module 100, the sealing gasket 300 and the heatsink 200 into a single body. One end of the long bolt may be inserted through the passage hole H1 of the battery module 100, pass through the passage hole H2 of the sealing gasket and the passage hole H3 of the heatsink 200, and be fastened onto a pack case (not shown). In this way, the battery module 100, the sealing gasket 300 and the heatsink 200 may be fixed to the pack case as a single body, thereby stably ensuring the waterproof and dustproof functions.

Figure 8:
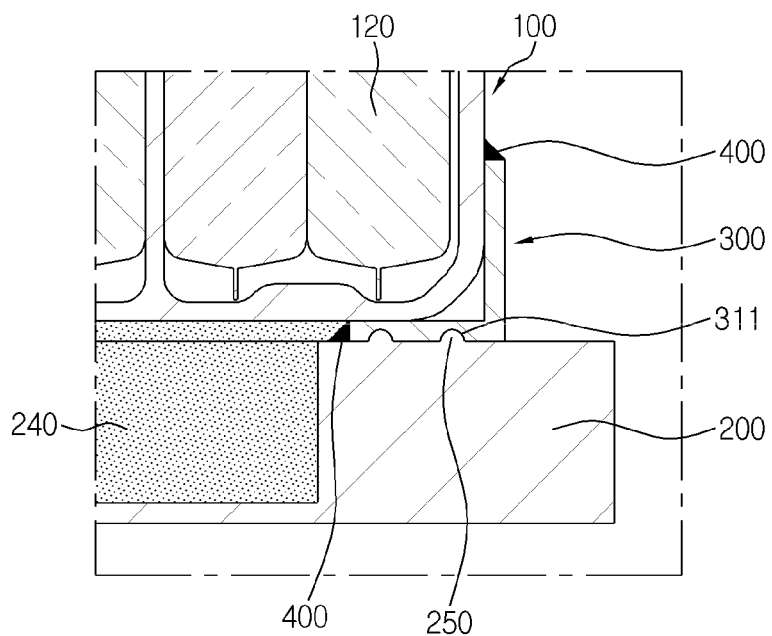
FIG. 8 is a diagram showing another embodiment of the cooling configuration depicted in FIG. 7.
Figure 9:
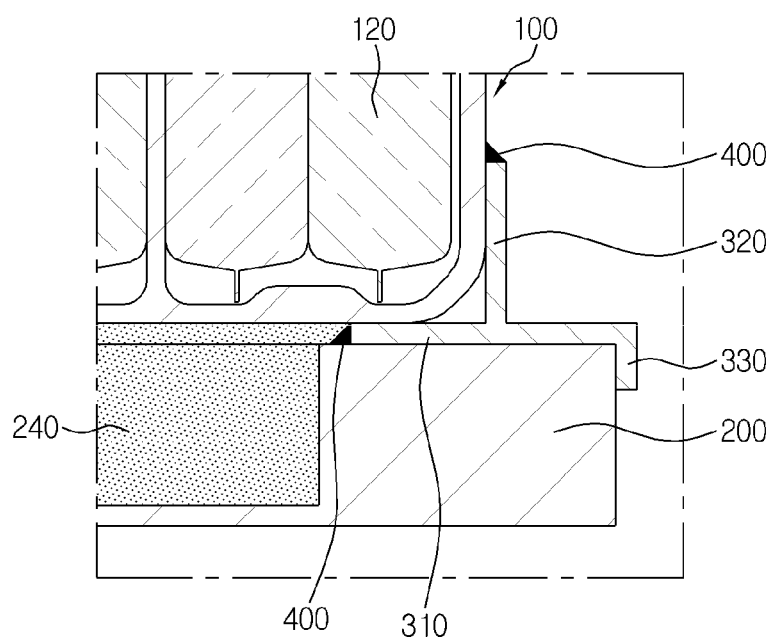
FIG. 9 is a diagram showing still another embodiment of the cooling configuration depicted in FIG. 7.

FIG. 8 is a diagram showing another embodiment of the cooling configuration depicted in FIG. 7, and FIG. 9 is a diagram showing still another embodiment of the cooling configuration depicted in FIG. 7.

Subsequently, the cooling configuration of the battery pack according to other embodiments of the present disclosure will be described briefly with reference to FIGS. 8 and 9. Like reference numerals denote like components, and the same component will not be described in detail, and features different from the former embodiments will be described in detail.

The battery pack according to another embodiment of the present disclosure may further include a coupling protrusion 250 provided to any one of the sealing gasket 300 and the top surface of the heatsink 200 and a coupling groove 311 provided to the other thereof so that the coupling protrusions 250 is fit into the coupling groove 311.

For example, in FIG. 7, the sealing gasket 300 is adhered to or directly placed on the top surface of the heatsink 200. However, in the cooling configuration shown in FIG. 8, the sealing gasket 300 may be fixed to the top surface of the heatsink 200 by applying an uneven structure instead of the adhering method.

In this embodiment, the sealing gasket 300 may be easily guided to be assembled to the heatsink 200 by the coupling protrusion 250 and the coupling groove 311. Also, the sealing gasket 300 may ensure the fixation and sealing without using an adhesive, and the sealing gasket 300 may be easily separated from heatsink 200, thereby ensuring easy maintenance of product later.

Next, in the cooling structure of the battery pack shown in FIG. 7, the sealing gasket 300 covers only the edge line of the bottom surface of the battery module 100. However, in the cooling structure of the battery pack shown in FIG. 9, the sealing gasket 300 has a doubly bent form to further surround the edge portion of the heatsink 200 where the top surface and the side surface of the heatsink 200 intersect each other.

Specifically, as shown in FIG. 9, the sealing gasket 300 of this embodiment may include a support portion 310, a first bent portion 320 and a second bent portion 330. Here, the support portion 310 corresponds to a portion which abuts against the bottom surface of the battery module 100, the first bent portion 320 corresponds to a portion which is bent upwardly with respect to the support portion 310 and abuts against the side surface of the battery module 100, and the second bent portion 330 corresponds to a portion which is bent downwardly with respect to the support portion 310 and abuts against the side surface of the heatsink 200.

In this embodiment, after the sealing gasket 300 is firstly placed to cover the top surface of the heatsink 200, the battery module 100 may be inserted into the sealing gasket 300. In this case, the battery module 100 may be assembled at a predetermined position by means of the sealing gasket 300, and thus the battery module 100 may be very easily aligned with respect to the heatsink 200.

In addition, since the corner line of the bottom surface of the battery module 100 and the edge line of the top surface of the heatsink 200 are finished by the sealing gasket 300, it is possible to further enhance the waterproof and dustproof effects.

Meanwhile, though not shown in the figures, in addition to the above components, the battery pack according to the present disclosure may further include a battery management system (BMS), a current sensor, a fuse or the like for measuring current, voltage, temperature and electric energy of the battery modules and controlling the charging and discharging operations as a whole, as well as and a pack case for packaging the electrical components to be protected against external shocks or the like.

The battery pack according to the present disclosure may be applied to electric vehicles, hybrid electric vehicles and electric power storage devices.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may also be expressed differently based on a location of an observer or a shape in which an object is placed.

What is claimed is:

1. A battery pack, comprising:
   a battery module including a plurality of battery cells;
   a heatsink in which a cooling medium flows, the heatsink having an opening that is at least partially opened so that the cooling medium directly contacts at least one surface of the battery module through the opening;
   a sealing gasket mounted to the battery module to surround an outer periphery of the at least one surface of the battery module so as to prevent the cooling medium from leaking out of a contact interface of the battery module and the heatsink,
   wherein the sealing gasket includes a support portion that contacts a bottom surface of the battery module and a first bent portion that is bent perpendicularly with respect to the support portion and contacts a side surface of the battery module,
   wherein the support portion is disposed between the bottom surface of the battery module and a top surface of the heatsink; and
   a coupling member integrally connected to the battery module, the sealing gasket, and the heatsink to assemble the battery module, the sealing gasket, and the heatsink into a single body,
   wherein passage holes are formed at corner regions of the battery module, the sealing gasket, and the heatsink with the coupling member inserted therethrough.

2. The battery pack according to claim 1, wherein the opening is formed at a central region of the top surface of the heatsink, and wherein the battery module is disposed so that the bottom surface thereof is placed on the top surface of the heatsink while covering the opening of the heatsink.

3. The battery pack according to claim 2, wherein the sealing gasket is provided in a bent form to surround an edge portion of the battery module where the bottom surface thereof intersects the side surface thereof.

4. The battery pack according to claim 2, wherein the sealing gasket is provided to be capable of adhering to at least one of the battery module and the heatsink at a location between the bottom surface of the battery module and the top surface of the heatsink.

5. The battery pack according to claim 4, further comprising:
   a waterproof sealant applied along an outer side of an adhering portion of the sealing gasket between at least one of the battery module and the heatsink and the sealing gasket.

6. The battery pack according to claim 3, wherein:
   the sealing gasket is provided in a doubly bent form to further surround an edge portion of the heatsink where the top surface of the heatsink intersects a side surface thereof, such that the sealing gasket includes a second bent portion that is bent perpendicularly with respect to the support portion and contacts a side surface of the heatsink.

7. The battery pack according to claim 6, wherein the sealing gasket is made of rubber.

8. The battery pack according to claim 3, wherein a coupling protrusion is provided to any one of the sealing gasket and the top surface of the heatsink, and a coupling groove is provided to the other thereof so that the coupling protrusion is fit into the coupling groove.

9. The battery pack according to claim 1, wherein the battery module includes a module case having an inner space capable of accommodating the battery cells and cooling fins connecting a top surface and a bottom surface of the module case to partition the inner space.

10. The battery pack according to claim 9, wherein the cooling fins are integrally formed with the module case by means of extruding.

11. A vehicle, comprising a battery pack defined in claim 1.

12. A battery pack, comprising:
    a battery module including a plurality of battery cells;
    a heatsink in which a cooling medium flows, the heatsink having an opening that is at least partially opened so that the cooling medium directly contacts at least one surface of the battery module through the opening;
    a sealing gasket mounted to the battery module to surround an outer periphery of the at least one surface of the battery module to prevent the cooling medium from leaking out of a contact interface of the battery module and the heatsink,
    wherein the sealing gasket includes a support portion that contacts a bottom surface of the battery module and a first bent portion that is bent perpendicularly with respect to the support portion and contacts a side surface of the battery module,
    wherein the support portion is disposed between the bottom surface of the battery module and a top surface of the heatsink,
    wherein the opening is formed at a central region of the top surface of the heatsink,
    wherein the battery module is disposed so that the bottom surface thereof is on the top surface of the heatsink while covering the opening of the heatsink,
    wherein the sealing gasket is adherable to at least one of the battery module and the heatsink at a location between the bottom surface of the battery module and the top surface of the heatsink; and a waterproof sealant applied along an outer side of an adhering portion of the sealing gasket between at least one of the battery module and the heatsink and the sealing gasket.

13. The battery pack according to claim 12, wherein the sealing gasket is provided in a bent form to surround an edge portion of the battery module where the bottom surface thereof intersects the side surface thereof.

14. The battery pack according to claim 13, wherein the sealing gasket is provided in a doubly bent form to further surround an edge portion of the heatsink where the top surface of the heatsink intersects a side surface thereof, such that the sealing gasket includes a second bent portion that is bent perpendicularly with respect to the support portion and contacts a side surface of the heatsink.

15. The battery pack according to claim 13, wherein a coupling protrusion is provided to any one of the sealing gasket and the top surface of the heatsink, and wherein a coupling groove is provided to the other thereof so that the coupling protrusion is fit into the coupling groove.

16. The battery pack according to claim 12, further comprising:
a coupling member integrally connected to the battery module, the sealing gasket, and the heatsink to assemble the battery module, the sealing gasket, and the heatsink into a single body.

17. The battery pack according to claim 12, wherein the battery module includes a module case having an inner space capable of accommodating the battery cells and cooling fins connecting a top surface and a bottom surface of the module case to partition the inner space.

18. The battery pack according to claim 17, wherein the cooling fins are integrally formed with the module case by means of extruding.

19. A vehicle, comprising a battery pack defined in claim 12.

* * * * *